Jan. 27, 1948.          J. C. CROWLEY                 2,434,991
             LIQUID INFLATING DEVICE FOR TIRES
                Filed March 30, 1945          2 Sheets-Sheet 1

INVENTOR.
JOHN C. CROWLEY
BY
Kwis, Hudson, Boughton & Williams
ATTORNEYS

Jan. 27, 1948. J. C. CROWLEY 2,434,991
LIQUID INFLATING DEVICE FOR TIRES
Filed March 30, 1945 2 Sheets-Sheet 2
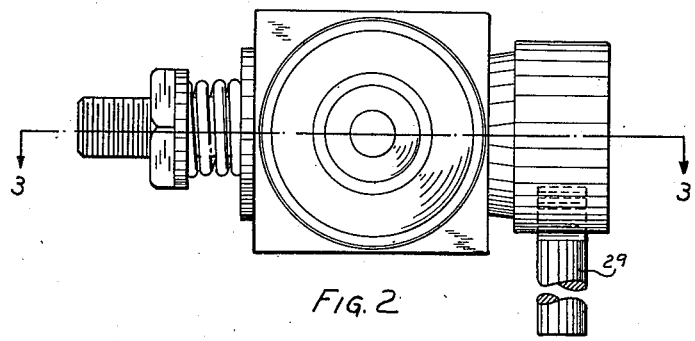
FIG. 2
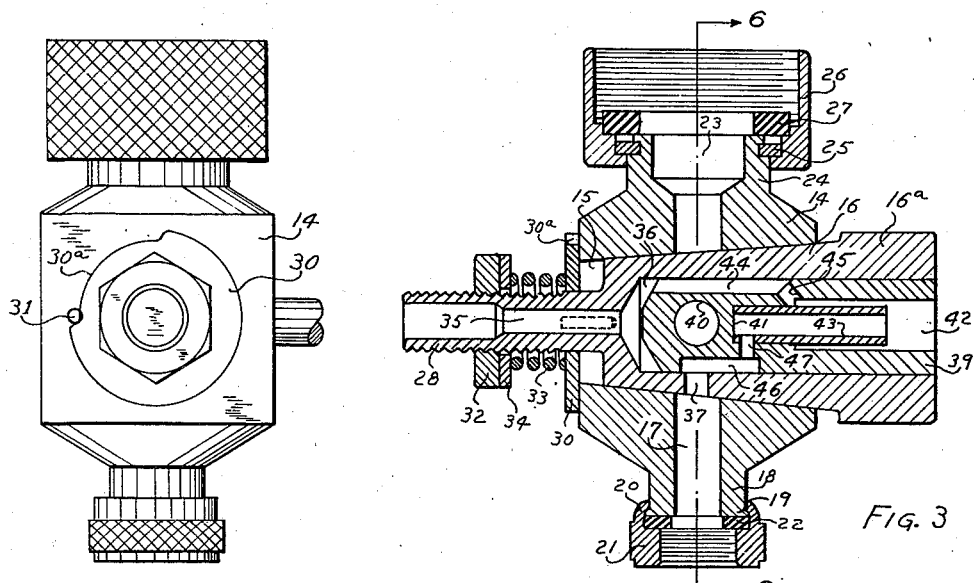
FIG. 5
FIG. 3
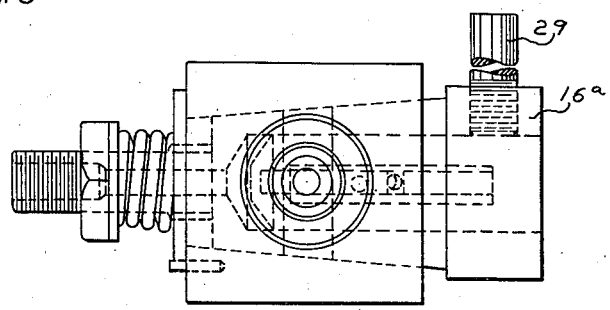
FIG. 4
INVENTOR.
JOHN C. CROWLEY
BY
Kwis, Hudson, Boughton & Williams
ATTORNEYS Patented Jan. 27, 1948

2,434,991

UNITED STATES PATENT OFFICE 2,434,991

LIQUID INFLATING DEVICE FOR TIRES

John C. Crowley, Willoughby, Ohio, assignor to The Dill Manufactur'ng Company, Cleveland, Ohio, a corporation of Ohio Application March 30, 1945, Serial No. 585,776

4 Claims. (Cl. 230—95)

This invention relates to a device for inflating with liquid tires, such as tractor tires.

It has been found desirable to completely fill the large heavy duty tires of such apparatus as tractors and the like with liquid to provide maximum traction and minimum slippage and obtain constant inflation and hence save tire wear. The liquid employed for such purpose may be either water or a suitable anti-freeze solution, such as a calcium chloride solution.

Difficulty has been experienced in completely filling the tires with liquid, due to the fact that air entrapped in the tires forms a pneumatic pressure head above the liquid flowing into the tires and prevents the complete filling of the tires with the liquid. It is necessary, therefore, first to completely exhaust the air from the tires in order to completely fill the same with liquid. This exhaustion of the air heretofore has been a time consuming operation or has required the use of expensive special apparatus which is not ordinarily available in garages or filling stations and which the individual customarily would not be provided with.

An object of the invention is to provide a readily operable device of simple design for completely inflating tires with liquid.

Another object is to provide a device such as referred to in the first named object and which device is relatively inexpensive and obviates the use of special expensive equipment for the purpose of completely inflating a tire with liquid.

Another object is to provide a device which can be used to completely fill a tire with liquid and which device is of such character that it can be used with the equipment usually available at garages or filling stations or frequently possessed by the individual operating the tractor or other apparatus.

Further and additional objects and advantages sought and accomplished by the invention will become apparent during the detailed description of an embodiment of the invention which is to follow.

Referring to the accompanying drawing illustrating said embodiment of the invention, Fig. 1 is a perspective view of a tire, such as a tractor tire, with the device embodying the invention connected to the valve stem of the tire.

Fig. 2 is a plan view of the device.

Fig. 3 is a sectional view through the device taken substantially on line 3—3 of Fig. 2, looking in the direction of the arrows.

Fig. 4 is a bottom view of the device looking from the underside of Fig. 3.

Fig. 5 is an end elevational view of the device looking from the left hand side of Fig. 3.

Figure 1:
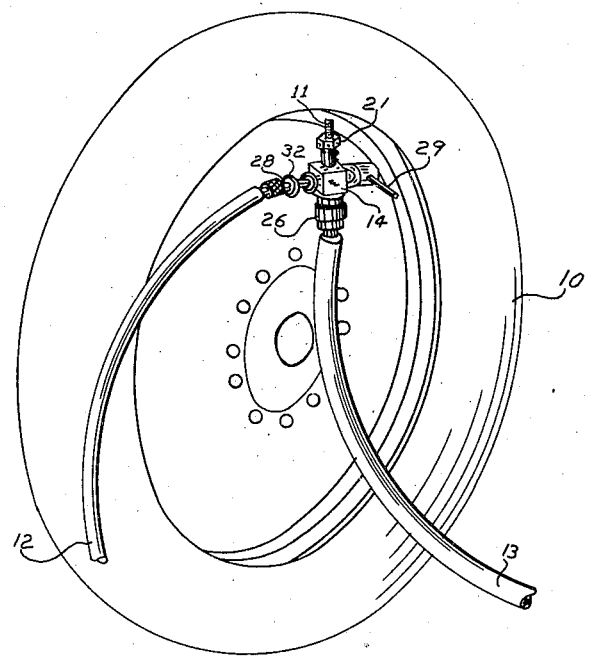

In Fig. 1, 10 represents the tire casing of a tractor tire, while 11 is the usual externally threaded valve stem connected with the tube of the tire. The device embodying the invention is shown as secured to the valve stem 11 and said device has connected to it, as will later be more fully explained, an air hose 12 and a hose 13 for the liquid such as water or a suitable antifreeze solution, as for instance a calcium chloride solution. The air hose 12 extends from any suitable source of supply of compressed air while the liquid hose 13 extends from a suitable source of supply of liquid either under pressure or so located that a gravity flow through the hose 13 will exist.

The device embodying the invention is shown for purposes of illustration as including a generally rectangular body 14. The body 14 is provided with a tapered bore 15 extending transversely through the body and rotatably mounting the tapered portion of a valve plug 16. The body 14 is provided with a passage 17 extending transversely to the tapered bore 15 and in communication therewith. The passage 17 adjacent one of its ends extends through a reduced circular portion 18 of the body and the end of said portion 18 is provided with an annular flange or bead 19 and about which extends the skirt 20 of an attaching nut 21 to swivelly connect the nut to the reduced circular portion 18 of the body. A gasket 22 is interposed between the nut 21 and the end of the portion 18. In applying the device to the valve stem 11 the nut 21 is screwed upon the externally threaded valve stem until the end of the stem contacts the gasket 22 to form a seal.

The other end of the passage 17 communicates with a counterbore 23 formed in a reduced circular portion 24 of the body and which portion is of larger diameter than the portion 18. The portion 24 has fixed thereto adjacent its outer end an external ring 25 and the inner end of a hose connecting fitting 26 underlies said ring, while a gasket 27 carried by the fitting 26 contacts the outer end of the portion 24 and hence said fitting 26 is swivelly connected to said portion. In use the fitting 26 connects the liquid hose 13 to the device as will be readily understood.

The valve plug 16 is provided at the small end of the tapered portion of the plug with a reduced externally threaded extension 28 that projects beyond the side of the body 14. The valve plug 16 on its end opposite to the end having the extension 28 is provided outwardly of the body 14 with an enlarged end 16a that has secured therein an operating handle 29 which is used to rotate the plug 16 to and from either one of two operative positions which will later be explained.

The extension 28 of the plug 16 has fitted thereon so as to rotate therewith a plate 30 which contacts the outside of the body 14. The plate 30 has a segmental portion of its circumference cut away as indicated at 30a and the ends of said cutaway portion engage, respectively, a fixed pin 31 projecting from the body 14 to define the limits of movement of the plug 16 in opposite directions when it is rotated from one operative position into the other operative position. The externally threaded extension 28 has screwed thereon an adjusting and retaining nut 32, while a coil spring 33 surrounds the extension intermediate the plate 30 and a washer 34 contacting the inner side of the nut 32. The spring 33 maintains the plate 30 against the outer side of the body 14 and holds the tapered portion of the plug 16 firmly seated in the tapered bore 15 and under spring tension. The nut 32 can be screwed inwardly or outwardly of the extension 28 to vary the effective force of the spring 33.

Figure 6:
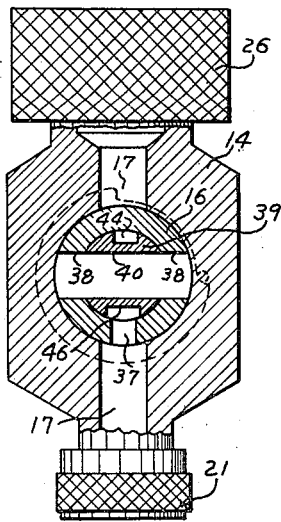
Fig. 6 is a partial elevational and sectional view of the device with the parts in one operative position and with the section taken substantially on line 6—6 of Fig. 3, looking in the direction of the arrows.

The extension 28 is provided with a bore 35 that communicates with a counterbore 36 extending from the small end of the tapered portion of the plug axially of the plug and through the outer enlarged end 16a thereof. The plug 16 is provided with a radially extending opening 37 which in one operative position of the plug is in communication with that portion of the passage 17 which is adjacent to the valve stem, see Figs. 3 and 6, and in the other operative position of the plug is out of communication with said passage, see Fig. 7. The plug 16 is also provided with diametrically aligned openings 38 spaced ninety degrees (90°) from the opening 37 and in one operative position of the plug 16 said openings 38 are out of communication with the passage 17, see Figs. 3 and 6, while in the other operative position of the plug 16 said openings 38 align and communicate with the passage 17, see Fig. 7.

An elongated cylindrical member 39 is mounted in the counterbore 36 of the plug and has a press fit therein so that said member and plug rotate as a unit. The member 39 terminates flush with the outer enlarged end 16a of the plug 16 and extends inwardly to adjacent the inner end of the counterbore 36. The member 39 is provided with a diametrically extending transverse opening 40 in alignment with the openings 38 in the plug 16 and forming therewith a continuous diametrical opening through the plug 16 and member 39. The member 39 is provided with an axially extending bore 41 located adjacent to the bore 40 and extending toward the right hand end of the member as viewed in the drawing and communicating with a counterbore 42. A tube 43 has a press fit in the bore 41 and is of such length that it extends partially through the counterbore 42, it being noted that an annular space is provided between the wall of the counterbore 42 and the exterior of the tube 43.

The member 39 is provided on its circumference with an axially extending groove 44 that communicates at its left hand end as viewed in the drawing with the counterbore 36, while its opposite end communicates with an opening 45 formed in the member 39 so as to place said end of the groove 44 in communication with the annular space between the wall of the counterbore 42 and the exterior of the tube 43.

The plug 16 and member 39 constitute a valve member which has a passage extending from end to end thereof and formed of the bore 35, counterbore 36, groove 44, opening 45 and counterbore 42.

The member 39 is provided on its circumference and diametrically opposite to the groove 44 with a shorter axially extending groove or channel 46 and which overlies and is in communication with the opening 37 in the plug 16. The groove or channel 46 is dead-ended slightly to the left of the opening 37 as viewed in the drawing, while its right hand end is in communication with an opening 47 formed in the member 39 and the tube 43, wherefore said channel or groove 46 is always in communication with the interior of the tube 43.

The structural details of the embodiment of the invention having been described, the manner in which the device is used will now be explained. The device is attached to the externally threaded valve stem 11 of the tire by screwing the attaching nut 21 onto the stem until the end of the stem is in sealing contact with the gasket 22. The liquid hose 13 is connected to the device by screwing the fitting 26 of the device onto the cooperating fitting carried by the end of the hose and until said cooperating fitting is in sealing contact with the gasket 27. The operator moves the handle 29 to rotate the valve member (the plug 16 and member 39) to the operative position shown in Figs. 3, 5 and 6 and at such time the opening 37 in the plug 16 is in communication with the interior of the stem and tire through that portion of the passage 17 adjacent to the stem, while the diametrical opening in the valve member (openings 38 in the plug 16 and the opening 40 in the member 39) is sealed from communication with the passage 17 and extends perpendicularly thereto. Assuming that liquid is free to flow through the hose 13 from the supply source it will be noted that such liquid at this time cannot flow into the tire since the valve member seals the passage 17 in the body against the flow of liquid therethrough and into the tire.

As previously explained, it is necessary in order to completely fill the tire with liquid to evacuate all of the air from the tire. In order to evacuate the air from the tire the fitting on the end of the air hose 12 is connected to the extension 28 of the plug 16 and air under pressure is caused to flow through the air hose 12. The air under pressure flows through the passage extending from end to end of the valve member (the bore 35 in the extension 28, the counterbore 36 in the plug 16, the groove 44, opening 45 and the counterbore 42) to atmosphere. Since the tube 43 is smaller in diameter than the counterbore 42, an annular space is provided between the tube and the wall of the counterbore and through which space the air flows. The air under pressure flowing outwardly of the counterbore 42 tends to cause a vacuum in the outer end of the tube 43 and said vacuum draws the entrapped air in the tire through the valve stem and through the passage 17, opening 37, groove or channel 46 and opening 47 into the interior of the tube 43 from whence it passes outwardly of the body through the counterbore 42 along with the air under pressure. The entrapped air is thus completely exhausted from the tube of the tire and the tube collapses.

Figure 7:
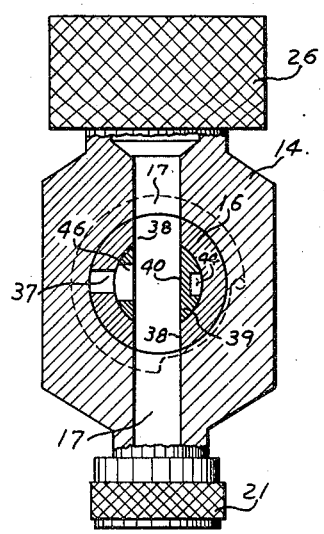
Fig. 7 is a view similar to Fig. 6 but with the valve member of the device in the other operative position and turned 90° from the position shown in Fig. 6.

The handle 29 is now rocked ninety degrees (90°) to rotate the valve member to its other operative position as indicated in Fig. 7. In this last named operative position the opening 37 in the plug 16 is sealed from communication with the passage 17 and hence from communication with the interior of the valve stem and tube. Also in this last mentioned operative position the diametral opening through the valve member and constituted by the aligned openings 38 and 40 is in alignment with the passage 17 and a continuous passage through the body and valve member exists through which the liquid may flow into the valve stem and into the tube of the tire until the tire is completely filled, whereupon the flow of liquid may be terminated and the device disconnected from the valve stem and the latter suitably sealed.

From the foregoing it will be seen that the device can be used to completely fill a tire with liquid and such use only requires equipment usually available in garages, service stations and the like, i. e., an air hose extending from a source of compressed air and a liquid hose from a source of supply of liquid. Consequently the use of the device is not dependent upon the availability of special equipment. It will also have been noted that the device can be operated with great facility and that it is simple in design and can be economically manufactured.

Although a preferred embodiment of the invention has been illustrated and described herein it will be understood that the device is susceptible of various modifications and adaptations within the scope of the appended claims.

Having thus described my invention, I claim:

1. In a device of the type specified, a body having a passage and a bore extending therethrough in intersecting relationship, means adjacent one end of said passage and adapted to connect said passage to a liquid supply source, means adjacent the other end of said passage and adapted to connect said passage to the valve stem of a tire, a valve member mounted in said bore and provided with an opening therethrough intermediate its ends, said member having a passage therethrough independent of said opening and communicating with atmosphere at one end, means operatively associated with said member adapted to connect said member passage adjacent its other end to a source of pressure fluid, said member being movable to one operative position wherein said member opening is in alignment with said body passage and to another operative position wherein said member interrupts said body passage, and second passage means in said member and communicating with said first member passage intermediate the ends thereof and when said member is in said last named operative position also communicating with said body passage adjacent said other end thereof.

2. In a device of the type specified, a body having a passage and a bore extending therethrough in intersecting relationship, means adjacent one end of said passage and adapted to connect said passage to a liquid supply source, means adjacent the other end of said passage and adapted to connect said passage to the valve stem of a tire, a valve member mounted in said bore and provided with an opening therethrough intermediate its ends, said member having a passage therethrough independent of said opening and communicating with atmosphere at one end, means operatively associated with said member adapted to connect said member passage adjacent its other end to a source of pressure fluid, said member having a tube extending longitudinally into said member passage inwardly of the one end thereof and of less diameter than said member passage, said member being movable to one operative position wherein said member opening is in alignment with said body passage and to another operative position wherein said member interrupts said body passage, said member having a second passage therein communicating with said tube and when said member is in said last named operative position also communicating with said body passage adjacent said other end thereof.

3. In a device of the type specified, a body having a passage therethrough and a bore therethrough intersecting said passage, means adjacent one end of said passage and adapted to connect said passage to a liquid supply source, means adjacent the other end of said passage and adapted to connect said passage to the valve stem of a tire, a valve plug rotatably mounted in said bore and extending through said body and having on one end a reduced extension, means on said reduced extension for connecting the latter to a source of pressure fluid, said plug having a bore extending inwardly through said extension and communicating with a counterbore extending to the opposite end of the plug and communicating with atmosphere, a member mounted in said counterbore and movable as a unit with said plug, said plug and member having aligned openings extending diametrically therethrough and adapted in one operative position of said plug to align with said body passage and in another operative position of said plug to be out of alignment with said body passage, said member outwardly of said opening being provided with a bore extending axially to the end of the member, said member being provided with a passage extending from the inner end of the member axially thereof and communicating with said plug counterbore and with said member bore, a tubular element carried by said member and extending into said member bore but terminating short of the outer end thereof and of less diameter than said member bore, said member being provided with a second passage communicating with said tubular element and said plug being provided with an opening extending from the exterior of the plug and communicating with said second named member passage and acting when said plug is in said second named operative position to place said tubular element in communication with said body passage adjacent said other end thereof.

4. In a device as defined in claim 3 and wherein said body bore and said plug are of complementary tapered configuration while spring means surrounds said extension of said plug and reacts against said body, and an adjustable element mounted on said extension and maintaining said plug tightly engaged in said body bore.

JOHN C. CROWLEY.

REFERENCES CITED

The following references are of record in the file of this patent:

UNITED STATES PATENTS

| Number | Name | Date |
| --- | --- | --- |
| 1,491,115 | Taylor | Apr. 22, 1924 |
| 2,349,594 | McMahan | May 13, 1944 |
| 2,364,211 | Gustafson | Dec. 5, 1944 |